(12) United States Patent
Zhang

(10) Patent No.: US 12,114,766 B1
(45) Date of Patent: Oct. 15, 2024

(54) ELECTRIC TOOTHBRUSH HEAD AND ELECTRIC TOOTHBRUSH

(71) Applicant: Huizhou Mint Leaf Technology Co., Ltd, Huizhou (CN)

(72) Inventor: Jianhua Zhang, Huizhou (CN)

(73) Assignee: Huizhou Mint Leaf Technology Co., Ltd, Huizhou (CN)

( * ) Notice: Subject to any disclaimer, the term of this patent is extended or adjusted under 35 U.S.C. 154(b) by 0 days.

(21) Appl. No.: 18/586,616

(22) Filed: Feb. 26, 2024

(30) Foreign Application Priority Data

Jan. 30, 2024 (CN) .................. 202410125864.X

(51) Int. Cl.
| | |
|---|---|
| *A46B 5/00* | (2006.01) |
| *A46B 13/02* | (2006.01) |
| *A61C 17/22* | (2006.01) |
| *A61C 17/32* | (2006.01) |

(52) U.S. Cl.
CPC ............ *A46B 5/002* (2013.01); *A46B 5/0095* (2013.01); *A46B 13/023* (2013.01); *A61C 17/222* (2013.01); *A61C 17/32* (2013.01)

(58) Field of Classification Search
CPC ..... A46B 5/002; A46B 5/0095; A46B 13/023; A61C 17/222; A61C 17/32
See application file for complete search history.

(56) References Cited

FOREIGN PATENT DOCUMENTS

CN          113081355 A    *   7/2021   ........... A61C 17/222

* cited by examiner

*Primary Examiner* — Shay Karls

(57) ABSTRACT

An electric toothbrush brush head and an electric toothbrush are provided. The brush head has a rod portion extending thereof, a driving shaft of the electric toothbrush is inserted into a groove formed at the rod portion, and the rod portion and the driving shaft have first and second limiting portions to fix the position. When an electric motor core inside the electric toothbrush is activated to drive the driving shaft to generate high-frequency motion, the bristles on the brush head can brush teeth. As the driving shaft in this scheme is in contact with the rod portion which is a part of the brush head and extending from the head portion, therefore, the vibration of the driving shaft can be directly transmitted to the head portion.

8 Claims, 14 Drawing Sheets

ELECTRIC TOOTHBRUSH HEAD AND ELECTRIC TOOTHBRUSH

FIELD OF THE INVENTION

The present invention relates to the field of electric toothbrush technology, especially to an electric toothbrush head and an electric toothbrush having same.

BACKGROUND OF THE INVENTION

An electric toothbrush can drive a brush head thereof to produce a high-frequency movement through a rapid rotation or vibration of a motor core, so that toothpaste can be quickly decomposed into fine foam, and teeth can be thoroughly cleaned. In order to extend a service life of an electric toothbrush, a brush handle with a driving shaft at the end and the brush head with bristles is usually detachably connected, so that when the bristles on the brush head deform severely, the brush head can be replaced.

The existing brush heads are generally connected to the driving shafts through connectors. Specifically, both the brush head and the connector are internally hollow. When installing, the connector is fixed inside the brush head, and then the driving shaft is fixed inside the connector to fix the brush head on the driving shaft. However, this connection will cause the vibration of the driving shaft to be not directly transmitted to the brush head, vibration will be hindered and attenuated by the connector during transmission, thereby affecting the vibration frequency of the bristles.

SUMMARY OF THE INVENTION

(1) Solved Technical Problem

To solve the above problems, the present invention provides an electric toothbrush head and an electric toothbrush, which can directly transmit the vibration of the driving shaft to the head portion.

(2) Technical Solution

To achieve the above objectives, the present invention provides the following technical solution:

An electric toothbrush head for connecting a driving shaft of an electric toothbrush includes a head portion having bristles, and a rod portion extending from the head portion. The rod portion is provided with a groove for being connected to the driving shaft, so that the driving shaft can be inserted into the groove to transmit a vibration to the rod portion. The groove is equipped with a first limiting portion, the driving shaft is equipped with a second limiting portion corresponding to the first limiting portion, and the rod portion and the driving shaft are detachably connected through the fit between the first limiting portion and the second limiting portion.

In a preferred embodiment, the head portion is detachably connected to the rod portion.

In a preferred embodiment, the electric toothbrush head further includes a connector installed on the outside of the rod portion, and the rod portion is equipped with a slot in communication with the groove, the connector being equipped with a convex bar matched with the slot, and the first limiting portion is located on the side of the convex bar facing the rod portion.

In a preferred embodiment, the electric toothbrush head further includes a movement limiting assembly installed on the rod portion and can be detachably connected to a handle of the electric toothbrush, the rod portion is connected to the driving shaft to form a primary limit, and the movement limiting assembly is connected to the handle to form a secondary limit, and used to limit the movement range of the rod portion to obstruct the rod portion from detaching from the driving shaft.

In a preferred embodiment, wherein the movement limiting assembly includes an outer shell and a plug located within the outer shell, and the connector is located between the outer shell and the plug; the outer shell is arranged vertically and has a top opening and a bottom opening, and a size of the top opening of the outer shell is greater than a cross-sectional size of the rod portion and less than a cross-sectional size of the connector, and a size of the bottom opening is greater than the cross-sectional size of the connector; the plug can be detachably connected to the outer shell and the handle of the electric toothbrush, and the plug is arranged vertically with a top opening and a bottom opening, with each of the top and bottom openings of the plug having a size greater than the cross-sectional size of the driving shaft, so that the driving shaft can pass through the plug and be inserted into the groove.

In a preferred embodiment, the electric toothbrush head further includes a rotation limiting assembly, the driving shaft can rotate back and forth, and the rotation limiting assembly is set between the movement limiting assembly and the rod portion to limit the rotation range of the rod portion.

In a preferred embodiment, wherein the rotation limiting assembly includes a limiting protrusion located on the side of the outer shell near the connector; and a limiting groove located on the side of the connector close to the outer shell and arranged in an arc shape, the limiting groove corresponding to the limiting protrusion and the length of the arc direction of the limiting groove being greater than the limiting protrusion, so that the connector and the outer shell can rotate relative to each other, and during the rotation, one end of the limiting protrusion can contact one end of the limiting groove along the arc direction, thus limiting the limit position of the rod portion during reciprocating rotation.

In a preferred embodiment, the electric toothbrush head further includes an amplitude reducing assembly, which is set between the rod portion and the driving shaft to reduce the rotation amplitude of the rod portion relative to the driving shaft.

In a preferred embodiment, wherein the groove and the driving shaft are both cylindrical in shape, so that the rod portion and the driving shaft can rotate with each other, the amplitude reducing assembly includes a first sector portion being located at the end of the driving shaft; and a second sector portion being located within the groove and corresponding to the first sector portion, the radius of the first sector portion, the second sector portion, and the driving shaft are the same, the radius of the groove is greater than the radius of the driving shaft, and the sum of the angles of the second sector portion and the first sector portion is less than 360°, such that the driving shaft being idle for an angle before contacting a side surface of the second sector portion during each reciprocating rotation, and thus the rotation angle of the rod portion is less than the rotation angle of the driving shaft.

In another aspect, an electric toothbrush is provided, the electric toothbrush includes a handle and an electric toothbrush brush head, wherein a driving shaft being provided on the handle, and the electric toothbrush head is detachably connected to the driving shaft.

(3) Beneficial Effects

Compared with the prior art, the present invention brings the following beneficial effects:

In actual use, the driving shaft is inserted into the groove of the rod portion, and the relative position of the rod portion and the driving shaft is fixed through the matching connection of the first and second limiting portions. Then, the electric motor core inside the electric toothbrush is started to drive the driving shaft to generate high-frequency motion, which can enable the bristles on the head portion to brush teeth. As the driving shaft in present scheme is directly in contact with the rod portion, which is a part of the brush head, the vibration of the driving shaft can be directly transmitted to the head portion. The vibration transmission process is not hindered by other components, and there is no attenuation or less attenuation, so the vibration frequency of the bristles is not affected or less affected than the existing electric toothbrushes on the market, resulting that the vibration frequency of bristles is higher. Overall, by using the electric toothbrush head, the vibration of the driving shaft can be directly transmitted to the head portion.

Figure 1:
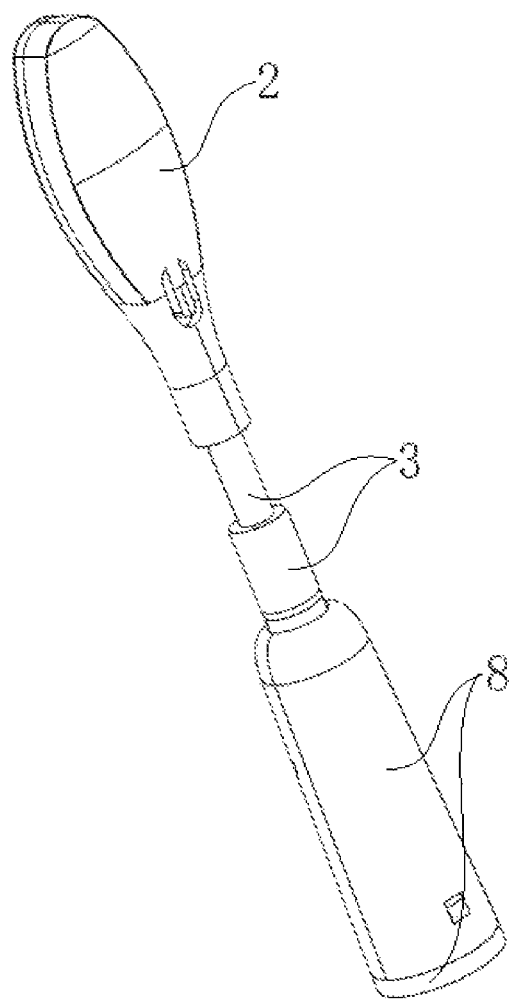
FIG. 1 is a schematic structural view of an electric toothbrush head according to an embodiment of present invention.

Labels in the drawing: 1, driving shaft; 2, head portion; 3, rod portion; 31, slot; 4, groove; 5, first limiting portion; 6, second limiting portion; 7, connector; 8, movement limiting assembly; 81, outer shell; 82, plug; 9, rotation limiting assembly; 91, limiting protrusion; 92, limiting groove; 10, amplitude reducing assembly; 101, first sector portion; 102, second sector portion; 11, handle; 111, protrusion; 12, convex bar

DETAILED DESCRIPTION OF PREFERRED EMBODIMENTS

The following will provide a clear and complete description of the technical solution in the embodiments of the present invention, in conjunction with the accompanying drawings. Obviously, the described embodiments are only a part of the embodiments of the present invention, not all of them. Based on the embodiments in the present invention, all other embodiments obtained by ordinary technicians in the art without creative labor fall within the scope of protection of the present invention.

Figure 2:
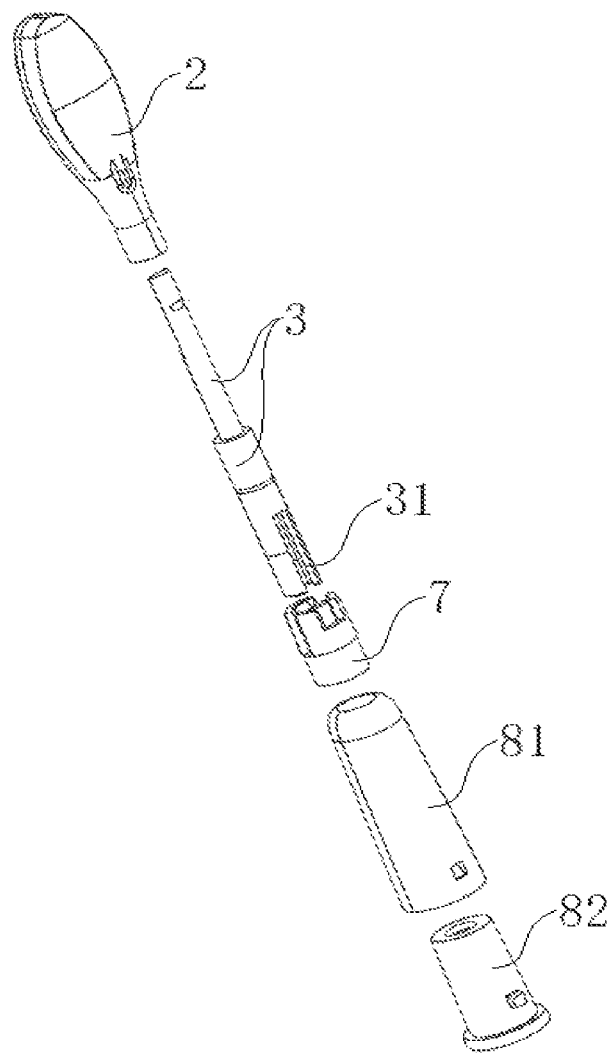
FIG. 2 is an exploded schematic structural view of the electric toothbrush head of FIG. 1.
Figure 12:
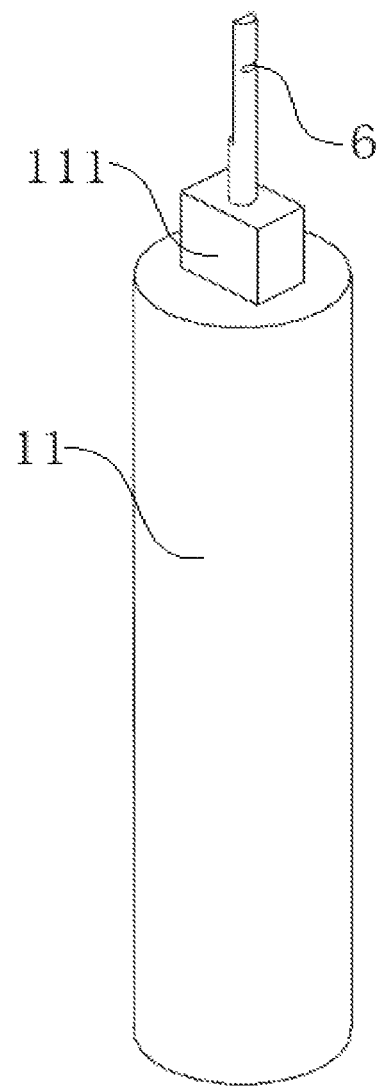
FIG. 12 is a schematic structural view of a driving shaft on a handle of an electric toothbrush according to an embodiment of present invention.
Figure 13:
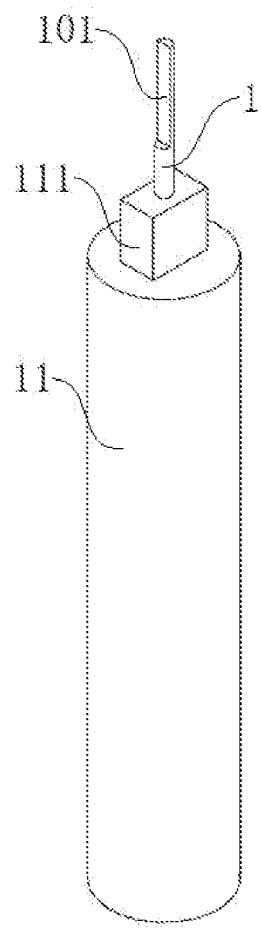
FIG. 13 is another schematic structural view of a driving shaft one a handle of an electric toothbrush according to an embodiment of present invention.

Referring to FIGS. 1-2, and FIG. 12, an electric toothbrush head is provided for connecting a driving shaft 1 (see FIG. 12) of an electric toothbrush. The electric toothbrush head includes a head portion 2 having bristles, and a rod portion 3 extending from the head portion 2. The rod portion 3 extends a distance between the head portion 2 and the driving shaft 1.

Figure 7:
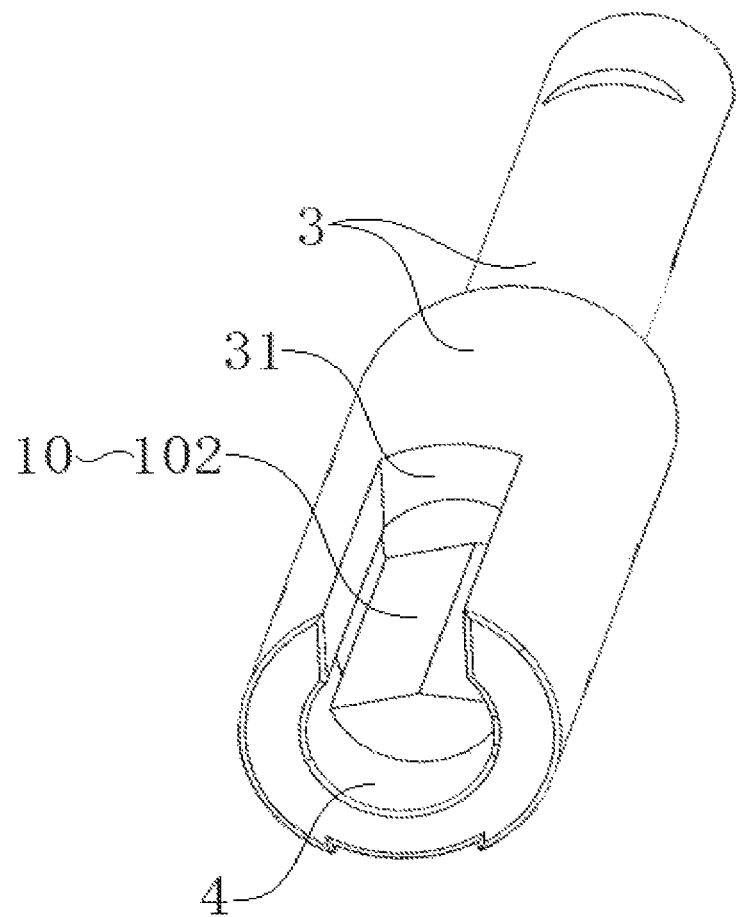
FIG. 7 is another schematic structural view of the rod portion of the electric toothbrush head of FIG. 1.
Figure 9:
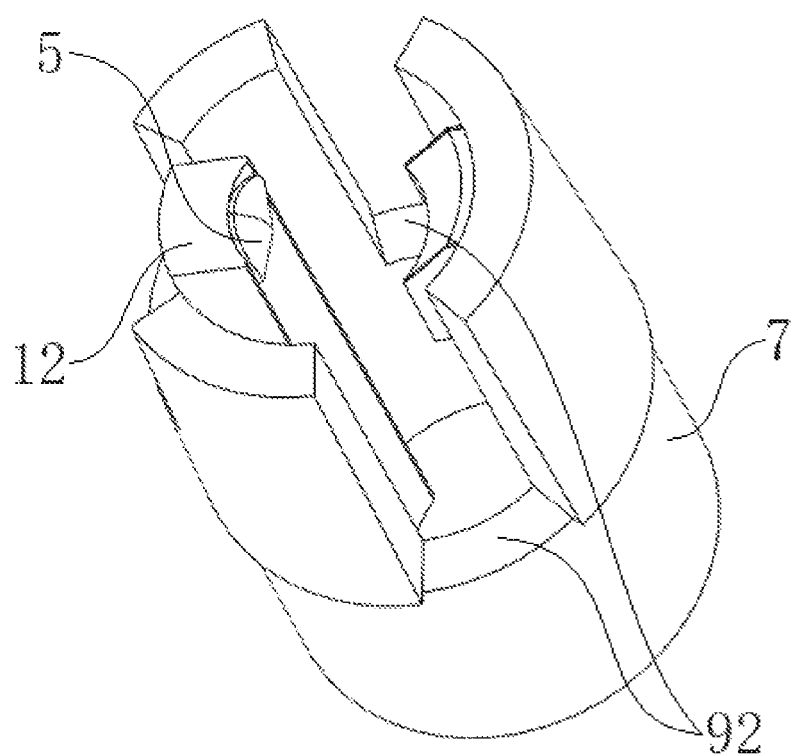
FIG. 9 is a schematic structural view of a connector used in the electric toothbrush head of FIG. 1.

Referring also to FIG. 7 and FIG. 9, the rod portion 3 has a groove 4 configured for being slidably connected to the driving shaft 1, so that the driving shaft 1 can be inserted into the groove 4 and directly transmit the generated vibration to rod portion 3. In particular, the groove 4 is equipped with a first limiting portion 5, and the driving shaft 1 is equipped with a second limiting portion 6 (see FIG. 12) corresponding to the first limiting portion 5, the rod portion 3 and driving shaft 1 can be detachably connected through the fit of the first limiting portion 5 and the second limiting portion 6, so as to fix the relative position between rod portion 3 and driving shaft 1.

In actual use, insert the driving shaft 1 into the groove 4 and fix the relative position between the rod portion 3 and the driving shaft 1 through the matching connection of the first limiting portion 5 and the second limiting portion 6. Then, start the motor core inside the electric toothbrush to drive the driving shaft 1 to generate high-frequency motion, which can enable the bristles on the head 2 to brush teeth. As the driving shaft 1 in present scheme is directly in contact with the rod portion 3, which is a part of the brush head, therefore, the vibration of driving shaft 1 can be directly transmitted to the brush head, and the vibration will not be obstructed by other components during the transmission process. The vibration transmission has no attenuation or a small attenuation, so that the vibration frequency of the bristles is not affected or less affected. Compared with existing electric toothbrushes on the market, the vibration frequency of the bristles is higher. Overall, by using the electric toothbrush head, the vibration of driving shaft 1 can be directly transmitted to the brush head.

Referring to FIG. 9 and FIG. 12, the electric toothbrush head in the present invention is suitable for various types of electric toothbrushes. In addition, the present invention does not specify the specific structure and detachable connection method of the first limiting portion 5 and the second limiting portion 6. In order to more clearly introduce the structure of the electric toothbrush head, the following design is carried out in this embodiment. Specifically, the first limiting portion 5 is an elastic arc-shaped convex structure, and the second limiting portion 6 is an arc-shaped groove structure corresponding to the first limiting portion 5, so that when the driving shaft 1 is inserted into the groove 4, the first limiting portion 5 and the second limiting portion 6 can be connected with buckles.

Figure 5:
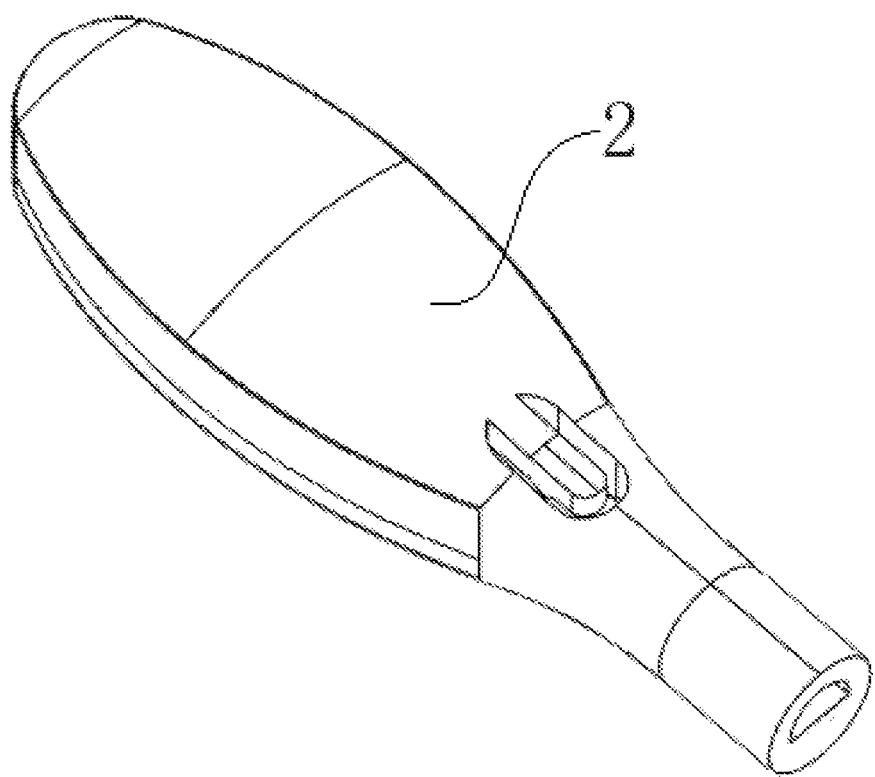
FIG. 5 is a schematic structural view of the head portion of the electric toothbrush head of FIG. 1.
Figure 6:
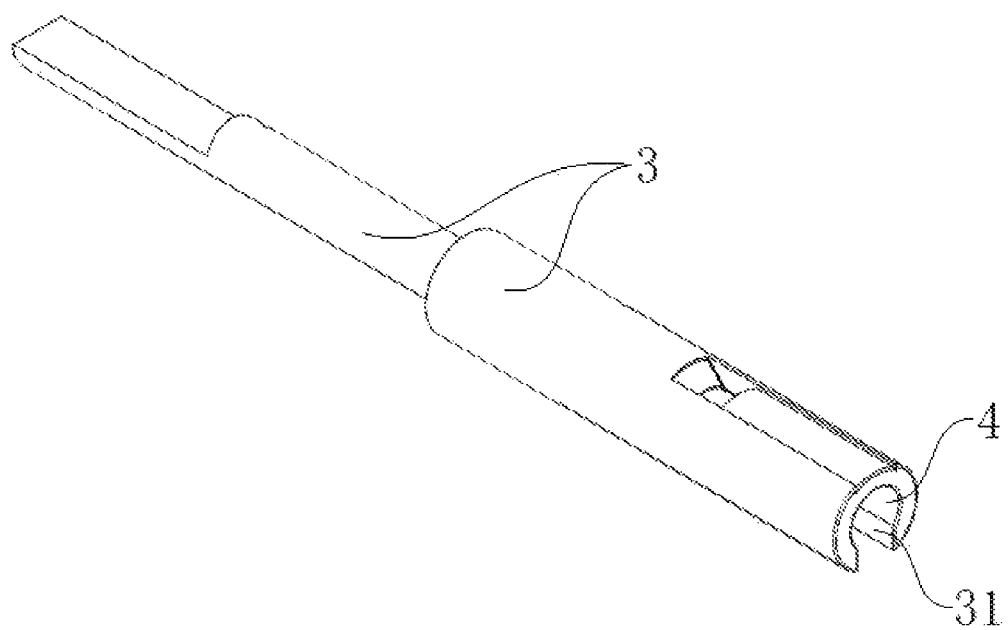
FIG. 6 is a schematic structural view of the rod portion of the electric toothbrush head of FIG. 5.

Referring also to FIG. 2 and FIGS. 5-6, it is inevitable that the bristles will deform after long-term use. When replacing, people usually throw away the entire toothbrush head. However, the toothbrush head mainly consists of two parts: the head portion 2 and rod portion 3. Although the bristles on head portion 2 deform during brushing, the rod portion 3 is not affected, especially when the rod portion 3 on the market is embedded with other complex components, if it is directly thrown away, this will cause waste of resources. In order to solve the above problems, the following design has been carried out in this embodiment, specifically, the head portion 2 is detachably connected to the rod portion 3.

Through the design of the above structure, damaged components can be replaced in a targeted manner after the bristles deform, extending the service life of the rod portion 3 and saving more resources.

Furthermore, the head portion 2 and the rod portion 3 can be detachably connected by a buckle connection. Furthermore, a slot can be formed at one end of the head portion 2, a hollow part can be formed on the side, and an elastic part with a buckle head can be formed at the hollow part. A buckle groove corresponding to the buckle head can be formed on the side of the rod portion 3, so that the elastic part can deform during the buckle connection process between the head portion 2 and the rod portion 3 through the buckle head and buckle groove, making the buckle connection process smoother.

Based on the above scheme, it can be seen that the first limiting portion 5 is located inside the groove 4, but it is difficult to process directly in the hole or groove, and in order to reduce the processing difficulty of the first limiting portion 5, the following design has been carried out in this embodiment. Specifically, please refer to FIGS. 2-4, the electric toothbrush head includes a connector 7, which is installed outside the rod portion 3. The rod portion 3 has a slot 31 connected to the groove 4, the connector 7 is equipped with a convex bar 12 that matches the slot 31, and the first limiting portion 5 is located on the side of the convex bar 12 facing the rod portion 3.

Through the design of the above structure, the first limiting portion 5 and the rod portion 3 can be processed separately, which is less difficult to process, and avoiding the direct processing of the first limiting portion 5 in the narrow groove 4. Moreover, since the connector 7 with the first limiting portion 5 is installed outside the rod portion 3, the connector 7 will not affect the vibration transmission between the driving shaft 1 and the rod portion 3.

It should be noted that the present invention does not limit the specific structure of the connector 7 or the connection method with the rod portion 3. It can be flexibly selected according to actual needs, such as selecting a cylindrical connector 7, so that the connector 7 can be fitted outside the rod portion 3 and connected to its buckle, which has the advantages of simple structure, reliable connection, and convenient disassembly.

Furthermore, please referring to FIG. 9, based on the cylindrical shape of connector 7, the lower part of the convex bar 12 is connected and fixed to the connector 7, and the upper part is suspended and connected to the first limiting portion 5, which can make the connection between the connector 7 and rod portion 3 more tight. At the same time, the upper part of connector 7 is easy to deform, allowing the first limiting portion 5 to be more smoothly connected to the driving shaft 1 through a snap connection.

Due to the high-frequency movement of rod portion 3 under the drive of the driving shaft 1, it is possible for the rod portion 3 to detach from the driving shaft 1 under the influence of centrifugal force. In order to solve the above problem, the following design has been carried out in this embodiment. Specifically, please refer to FIGS. 1-4 and 12-13, the electric toothbrush brush head also includes a movement limiting assembly 8, which is installed on rod portion 3 and can be detachably connected to the handle 11 of the electric toothbrush, the rod portion 3 is connected to driving shaft 1 to form a primary limit, and the movement limiting assembly 8 is connected to the handle 11 to form a secondary limit, thus limiting the movement range of the rod portion 3 to prevent it from being detached by mistake from the driving shaft 1. That is, if the rod portion 3 wants to detach from the driving shaft 1, it needs to overcome the above two forces, which is safer and more reliable than existing electric toothbrushes.

Please refer to FIGS. 2, 4, and 10-11 together, there are various structures that can limit the movement of rod portion 3, one of them is introduced in this embodiment. Specifically, the movement limiting assembly 8 includes an outer shell 81 and a plug 82 located inside the outer shell 81, and the connector 7 is located between the outer shell 81 and the plug 82. The outer shell 81 is arranged vertically with a top opening and a bottom opening, and a size of the top opening is greater than a cross-sectional size of rod portion 3 and less than a cross-sectional size of the connector 7, the bottom opening size is greater than the cross-sectional size of the connector 7. The plug 82 can be detachably connected to the outer shell 81 and the handle 11 of the electric toothbrush, and the plug 82 is arranged vertically with a top opening and a bottom opening, with the top and bottom opening sizes both greater than the cross-sectional size of the driving shaft 1, so that the driving shaft 1 can pass through the plug 82 and be inserted into the groove 4.

Through the design of the above structure, the connector 7 can be limited between the top of the outer shell 81 and the top of the plug 82, and the connector 7 is tightly connected to rod portion 3. Therefore, when the plug 82 is connected to the outer shell 81 and the handle 11 of the electric toothbrush, the rod portion 3 will be obstructed by the outer shell 81 when it detaches from the driving shaft 1, thereby making an obstruction, i.e., preventing the rod portion 3 from detaching by mistake from the driving shaft 1.

Furthermore, based on the above scheme, the following design has been carried out in this embodiment. Specifically, in order to ensure the smooth and beautiful appearance of the electric toothbrush, please refer to FIGS. 12 and 13, a protrusion 111 with a size smaller than that of the handle 11 can be set at the connection part between the handle 11 and the driving shaft 1 of the electric toothbrush, then, the plug 82 and the protrusion 111 are connected with damping sliding, such that the movement limiting assembly 8 can be tightly connected to the handle 11. In addition, the protrusion 111 makes the plug 82 tightly connected to the outer shell 81.

There are various ways of movement for the driving shaft 1, and there are two main forms of the driving shaft 1 for electric toothbrushes on the market including reciprocating swing and reciprocating rotation. Among them, the reciprocating swing driving shaft 1, which can swing back and forth, can only brush teeth at the corresponding position of the bristles, that is, the area of the bristles corresponds to the largest area of teeth can be brushed. The reciprocating rotation driving shaft 1, which can rotate back and forth, is usually used in conjunction with other components, allowing the bristles on the brush head to rotate back and forth, and the axis direction of the bristles when rotating is perpendicular to the axis direction of the driving shaft 1 when rotating, this method can only brush teeth at the corresponding position of the bristles. In addition, this brushing method can only brush one tooth at a time, and compared to the reciprocating electric toothbrush, the brushing range is smaller and the operation time is longer. In order to brush more teeth at once, the following design has been carried out in this embodiment. Specifically, it also includes a rotation limiting assembly 9, the driving shaft 1 can rotate back and forth, and the rotation limiting assembly 9 is set between the movement limiting assembly 8 and the rod portion 3 to limit the rotation range of the rod portion 3.

Through the design of the above structure, the bristles on the head portion 2 can rotate back and forth, and the bristles rotate around an axis direction the same as the axis direction the driving shaft 1 rotates around. The bristles sweep a larger area during movement, allowing for brushing more teeth at once, such as simultaneously brushing the upper and lower teeth. In addition, due to the setting of the rotation limiting assembly 9, the angle range of rotation of the rod portion 3 can be effectively controlled, preventing the hairless part of head portion 2 from contacting teeth under the driving force of the rod portion 3 during the brushing process.

Figure 3:
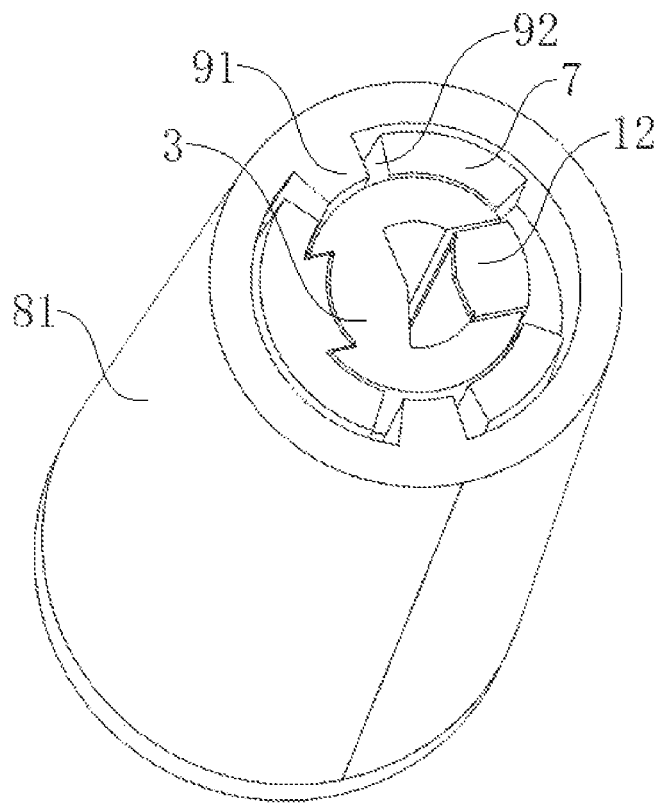
FIG. 3 is a partial view of the electric toothbrush head of FIG. 1.
Figure 4:
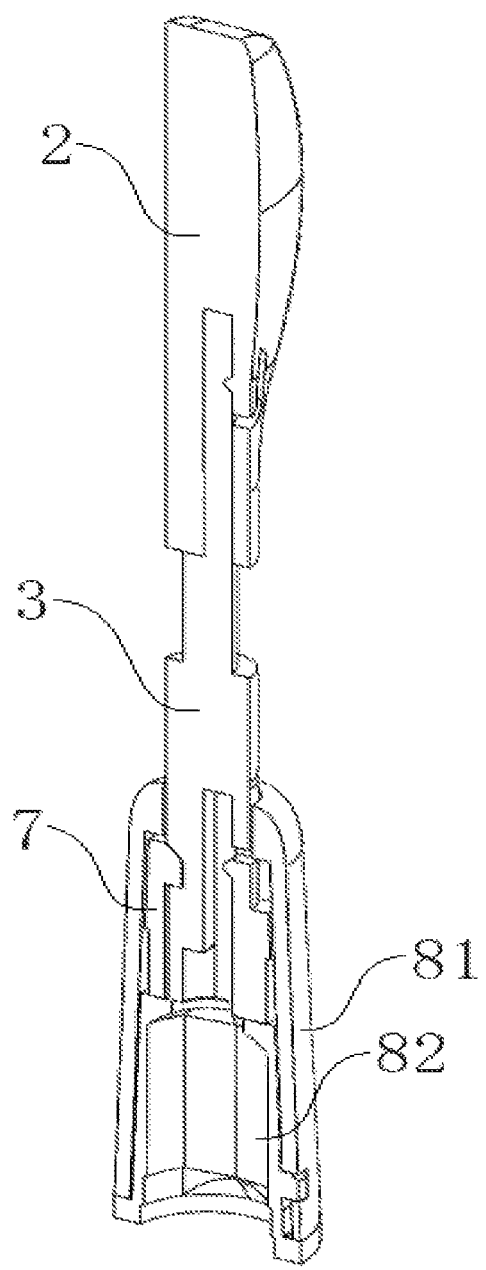
FIG. 4 is a cross sectional view of the electric toothbrush head of FIG. 1.
Figure 10:
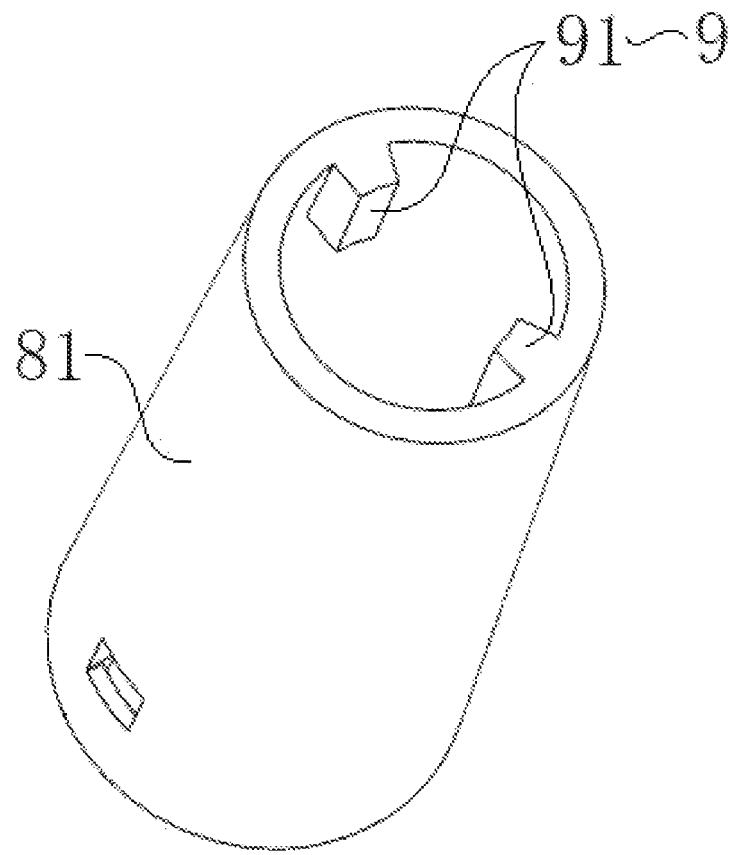
FIG. 10 is a schematic structural view of an outer shell used in the electric toothbrush head of FIG. 1.
Figure 11:
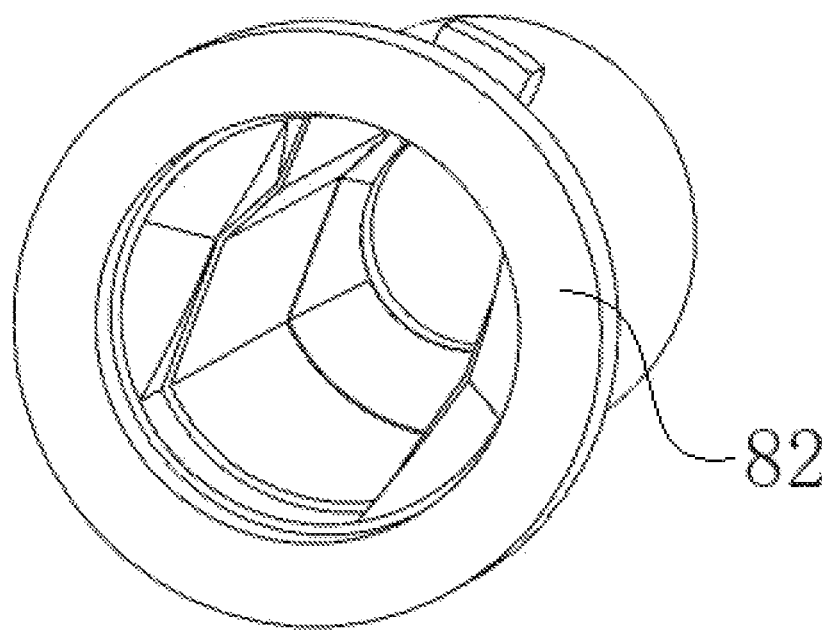
FIG. 11 is a schematic structural view of a plug used in the electric toothbrush head of FIG. 1.

Please refer to FIGS. 3 and 9-10 together, in order to illustrate more clearly how the rotation limiting assembly 9 limits the range of rotation angles of the rod portion 3, the structure of the rotation limiting assembly 9 has been designed as follows in this embodiment. Specifically, the rotation limiting assembly 9 includes a limiting protrusion 91 and a limiting groove 92, and the limiting protrusion 91 is located on the side of the outer shell 81 close to the connecting member 7, and the limiting groove 92 is located on the side of the connector 7 near the outer shell 81 and is arranged in an arc shape. The limiting groove 92 corresponds to the limiting protrusion 91, and the length of the arc direction of the limiting groove 92 is greater than the limiting protrusion 91, so that the connector 7 and the outer shell 81 can rotate relative to each other, and during the rotation process, one end of the limiting protrusion 91 can abut with one end of the limiting groove 92 along the arc direction, thereby limiting a limit position of the rod portion 3 when it rotates back and forth.

Through the design of the above structure, the limiting protrusion 91 can only move within the limiting groove 92, and the limiting protrusion 91 is directly or indirectly connected to the connector 7, the rod portion 3, and the head portion 2. Therefore, when the limiting protrusion 91 moves to the limit position, the connector 7, rod portion 3, and head portion 2 will also move to the limit position simultaneously, thereby achieving the purpose of limiting the rotation angle range of rod portion 3.

Furthermore, the rotation angle of the rod portion 3 can be limited to 5°-25°, which is more in line with the size of the teeth and prevents the bristles from contacting the gums during rotation.

Due to the high-frequency movement of the rod portion 3 under the driving shaft 1, if the movement limiting assembly 8 or the rotation limiting assembly 9 is too tightly connected to the rod portion 3, it will affect the normal operation of the rod portion 3. In order to solve the above problems, the following design is carried out in this embodiment: specifically, there is a gap between the outer wall of the rod portion 3 and the inner wall of outer shell 81, between the connector 7 and the inner wall of outer shell 8, between the end of the rod portion 3 far from head portion 2 and the plug 82, and between the limiting protrusion 91 and the limiting groove 82 to prevent damping when the rod portion 3 and the movement limiting assembly 8 move relative to each other, avoiding affecting the movement of the rod portion 3.

Through the design of the above structure, whether swinging or rotating, the rod portion 3 can avoid contact with the movement limiting assembly 8 and the rotation limiting assembly 9 during normal operation, except for running to the limit position or detaching from the driving shaft 1. It will not produce damping that affects the movement of the rod portion 3, nor will it cause corresponding component damage due to heat generated by friction.

Furthermore, in present embodiment, the gap distance between the outer wall of the rod portion 3 and the inner wall of the outer shell 81, the gap distance between the connector 7 and the inner wall of the outer shell 8, the gap distance between the plug 82 and the end of the rod portion 3 far from the head portion 2, and the gap distance between limiting protrusion 91 and limiting groove 82 are all set to 0.5 mm.

Please refer to FIG. 7, some electric toothbrushes having driving shafts 1 driven under the action of the motor core, rotate back and forth at an angle that is too large and difficult to adjust, which may cause the bristles to brush against the gums. In order to make the brush head of the electric toothbrush suitable for more electric toothbrushes, the following design has been carried out in this embodiment. Specifically, it also includes an amplitude reducing assembly 10. The driving shaft 1 can rotate back and forth, and the amplitude reducing assembly 10 is set between the rod portion 3 and driving shaft 1 to reduce the rotation amplitude of the rod portion 3 relative to the driving shaft 1.

Through the design of the above structure, the rotation angle of the bristles can be limited within a reasonable range, which can brush both the upper and lower teeth simultaneously without causing damage to the gums.

Figure 8:
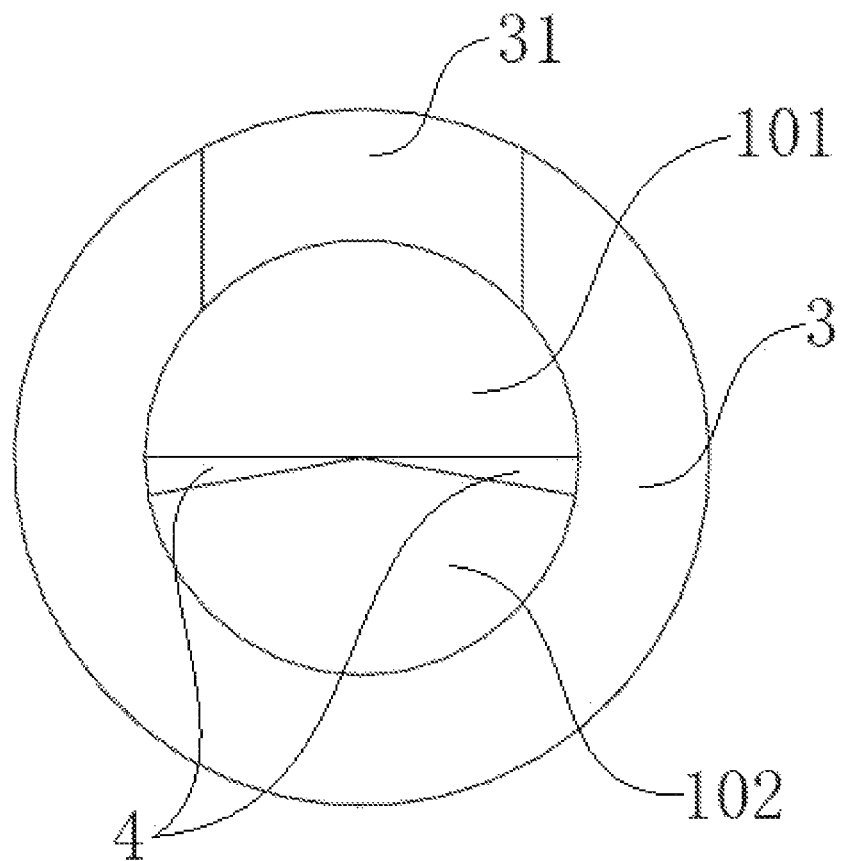
FIG. 8 is a plan view of a first and a second sector portions used in the electric toothbrush.

Based on the above scheme, the specific structure of the amplitude reducing assembly has been designed in this embodiment as follows. Specifically, the groove 4 and the driving shaft 1 are both cylindrical, so that the rod portion 3 and the driving shaft 1 can rotate with each other. Please refer to FIGS. 7-8, and 13, the amplitude reducing assembly 10 includes a first sector portion 101 and a second sector portion 102, and the first sector portion 101 is located at the end of the driving shaft 1, the second sector portion 102 is located inside the groove 4 and corresponds to the first sector portion 101. The radii of the first sector portion 101, the second sector portion 102, and the driving shaft 1 are the same. The radius of the groove 4 is greater than that of the driving shaft 1, and the sum of the angles of the second sector portion 102 and the first sector portion 101 is less than 360°, so that the driving shaft 1 first idles for a certain angle before coming into contact with the wall of the second sector portion 102 during each reciprocating rotation, thus, the rotation angle of the rod portion 3 is smaller than the rotation angle of driving shaft 1.

Through the design of the above structure, it is possible to make the rod portion 3 and the second sector portion 102 rotate due to inertia to the same angle as the forward rotation of the driving shaft 1, have already made contact with the first sector portion 101 that rotates in the opposite direction in advance, so that the rotation angle of the rod portion 3 is smaller than that of the driving shaft 1.

Furthermore, the radius of the groove 4 is 0.1 mm greater than that of the driving shaft 1; or alternatively, the groove 4 can also have the same radius as the driving shaft 1, and can also achieve the above functions.

It should be noted that the word of greater in the above statement that the radius of the groove 4 is greater than the radius of the driving shaft 1, does not affect the rotation of the rod portion 3 relative to the driving shaft 1.

It should be noted that the forward and reverse directions mentioned above specifically refer to the two directions in which driving shaft 1 rotates back and forth. For a clearer explanation, here are two examples:

First Embodiment

Based on the above scheme, it can be seen that there are two sets of opposite side surfaces between the first sector portion 101 and the second sector portion 102. Let the first side surface of the first sector portion 101 opposite to the first side surface of the second sector portion 102, and let the second side surface of the first sector portion 101 opposite to the second side surface of the second sector portion 102.

For example, taking the first side surface of the first sector portion 101 contacts the first side surface of the second sector portion 102 in its natural state as an example, defining a reference plane, and let the driving shaft 1 have a forward and reverse angle of 10° relative to the reference plane, and let the sum of the angles of the second sector portion 102 and the first sector portion 101 be 355°, at this time, there is only 5° angle space between the second side surface of the first sector portion 101 and the second side surface of the second sector portion 102.

When the driving shaft 1 rotates forward, taking the second side surface of the first sector portion 101 as an example, which can approach and contact the second side surface of the second sector portion 102 during the forward rotation process, the second side surface of the first sector portion 101 will be idle 5° before contacting the second side surface of the second sector portion 102. Therefore, while the first side sector portion 101 rotates forward by 10°, the second surface of the second side sector portion 102 only rotates forward by 5°, there is a 5° angle space between the first side surface of the first sector portion 101 and the first side surface of the second sector portion 102. Afterwards, the first sector portion 101 reverses under the drive of the driving shaft 1, but the second sector portion 102 continues to rotate forward under the action of inertia. Due to the influence of factors such as friction between the driving shaft 1 and the groove 4 and air resistance during the inertia rotation process, the forward rotation speed of the second sector portion 102 decreases, but the speed at which the first sector portion 101 reverses under the drive of the driving shaft 1 does not decay, therefore, the forward rotation angle of the second sector portion 102 under inertia is smaller than the reverse angle of the first sector portion 101, that is, the forward rotation angle of the second sector portion 102 under inertia is less than 2.5°, that is, a total forward rotation angle of the second sector portion 102 is less than 7.5°.

When the driving shaft 1 is reversed, the first side surface of the first sector portion 101 contacts the first side surface of the second sector portion 102, when the first sector portion 101 is reversed by 10°, the second sector portion 102 is also reversed by 10°. At this time, there is a 5° angle space between the second side surface of the first sector portion 101 and the second side surface of the second sector portion 102. Afterwards, the first sector portion 101 is driven forward by driving shaft 1, the second sector portion 102 continues to reverse under the action of inertia, as it is affected by factors such as frictional force and air resistance between the driving shaft 1 and the groove 4 during inertial rotation, resulting in a decrease in reverse speed. On the other hand, the first sector portion 101 does not experience a decrease in forward rotation speed under the drive of the driving shaft 1, therefore, the angle at which the second sector portion 102 reverses under inertial action is less than the angle at which the first sector portion 101 rotates forward, that is, the angle at which the second sector portion 102 reverses under inertial action is less than 2.5°, that is, a total angle at which the second sector portion 102 reverses is less than 12.5°.

It should be noted that when the radius of the groove 4 is greater than the radius of the driving shaft 1, under natural conditions, the inner wall of the groove 4 and the outer wall of the driving shaft 1 do not contact. However, during operation, due to back and forth rotation, the two may come into contact, resulting in frictional force, therefore even if there is no contact, under the influence of factors such as air resistance, the rod portion 3 will still lose energy during inertial motion, as a result, the rotation angle of rod portion 3 during inertial motion is smaller than the rotation angle of the driving shaft 1 during this process, ultimately achieving the goal of amplitude reduction.

In summary, the total angle of forward and reverse rotation of the first sector portion 101 is 20°, while the total angle of forward and reverse rotation of the second sector portion 102 is less than 20°. Therefore, the rotation angle of rod portion 3 is smaller than that of the driving shaft 1, thereby achieving the goal of reducing the rotation amplitude of rod portion 3.

Second Embodiment

The difference between this embodiment and the first embodiment is that in the natural state, there is an angle of 2.5° between the first side surface of the first sector portion 101 and the first side surface of the second sector portion 102, and there is an angle of 2.5° between the second side surface of the first sector portion 101 and the second side surface of the second sector portion 102.

According to Example 1, it can be seen that while the first sector portion 102 rotates forward by 10°, the second sector portion 102 also rotates forward by 7.5°. At this time, there is a 5° angle space between the first side surface of the first sector portion 101 and the first side surface of the second sector portion 102. Afterwards, the first sector portion 102 reverses, and the second sector portion 102 rotates forward by less than 2.5° under inertia, that is, a total angle of the second sector portion 102 rotating forward is less than 10°.

At the same time as the first sector portion 102 is reversed by 10°, the second sector portion 102 is reversed by 7.5°. At this time, there is a 5° angle space between the second side surface of the first sector portion 101 and the second side surface of the second sector portion 102. Afterwards, the first sector portion 102 turns forward, and the second sector portion 102 reverses by less than 2.5° under inertial action, i.e., a total reverse rotation angle of the second sector portion 102 is less than 10°

In summary, the total angle of forward and reverse rotation of the first sector portion 101 is 20°, while the total angle of forward and reverse rotation of the second sector portion 102 is less than 20°. Therefore, the rotation angle of rod portion 3 is smaller than that of the driving shaft 1, thereby achieving the goal of reducing the rotation amplitude of rod portion 3.

Furthermore, the angle of the second sector portion 102 and the sum of the angles of the first sector portion 101 are 5-25 degrees smaller than 360 degrees, in order to prevent the decrease in rotation angle of the rod portion 3 compared to the driving shaft 1 from being too small or too large.

Figure 14:
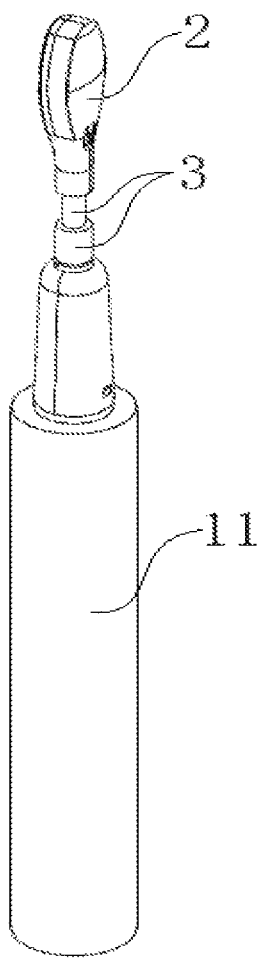
FIG. 14 is a schematic structural view of an electric toothbrush according to an embodiment of present invention.

The embodiment of the present invention also discloses an electric toothbrush, as shown in FIG. 14. The electric toothbrush comprises a handle 11 and an electric toothbrush brush head as described above. A driving shaft 1 is provided on the handle 11, and the electric toothbrush brush head is connected to the driving shaft 1.

It should be noted that the terms used here are only for describing specific embodiments, and are not intended to limit exemplary embodiments according to this application. As used here, unless otherwise explicitly stated in the context, the singular form is also intended to include the plural form. In addition, it should be understood that when the terms of including and/or including are used in this specification, they indicate the existence of features, steps, operations, devices, components, and/or their combinations.

In addition, it should be noted that the use of words such as first and second to define components is only for the purpose of distinguishing the corresponding components. Unless otherwise stated, the above words have no special meaning and cannot be understood as limiting the scope of protection of this application.

Although embodiments of the present invention have been shown and described, it can be understood by those skilled in the art that multiple variations, modifications, substitutions, and variations can be made to these embodiments without departing from the principles and spirit of the present invention. The scope of the present invention is limited by the accompanying claims and their equivalents.

What is claimed is:

1. An electric toothbrush brush head for connecting a driving shaft of an electric toothbrush, comprising:
   a head portion with bristles;
   a rod portion extending from the head portion; the rod portion comprising a groove for being connected to the driving shaft, such that the driving shaft can be inserted into the groove and transmit a generated vibration to the rod portion, the groove is equipped with a first limiting portion, and the driving shaft is equipped with a second limiting portion corresponding to the first limiting portion, the rod portion and the driving shaft are detachably connected through the fit of the first limiting portion and the second limiting portion;
   a connector installed on the outside of the rod portion;
   a movement limiting assembly installed on the rod portion and can be detachably connected to a handle of the electric toothbrush, wherein the rod portion is connected to the driving shaft to form a primary limit, and the movement limiting assembly is connected to the handle to form a secondary limit, and used to limit the movement range of the rod portion to obstruct the rod portion from detaching from the driving shaft;
   wherein the movement limiting assembly comprises an outer shell and a plug located within the outer shell, and the connector is located between the outer shell and the plug in a manner that the outer shell is arranged vertically and has a top opening and a bottom opening, a size of the top opening of the outer shell is greater than a cross-sectional size of the rod portion and less than a cross-sectional size of the connector, and a size of the bottom opening of the outer shell is greater than the cross-sectional size of the connector; the plug can be detachably connected to the outer shell and the handle of the electric toothbrush, the plug is arranged vertically with a top opening and a bottom opening, with each of the top and bottom openings of the plug having a size greater than the cross-sectional size of the driving shaft, so that the driving shaft can pass through the plug and be inserted into the groove.

2. The electric toothbrush brush head according to claim 1, wherein the head portion is detachably connected to the rod portion.

3. The electric toothbrush brush head according to claim 1, wherein the rod portion is equipped with a slot in communication with the groove, the connector being equipped with a convex bar matched with the slot, and the first limiting portion is located on the side of the convex bar facing the rod portion.

4. The electric toothbrush brush head according to claim 1, further comprising a rotation limiting assembly, the driving shaft can rotate back and forth, and the rotation limiting assembly is set between the movement limiting assembly and the rod portion to limit a rotation range of the rod portion.

5. The electric toothbrush brush head according to claim 4, wherein the rotation limiting assembly comprises:
   a limiting protrusion located on the side of the outer shell near the connector; and
   a limiting groove located on the side of the connector near the outer shell and arranged in an arc shape, the limiting groove corresponding to the limiting protrusion and a length of the arc direction of the limiting groove being greater than the limiting protrusion, so that the connector and the outer shell can rotate relative to each other, and during the rotation, one end of the limiting protrusion can contact one end of the limiting groove along the arc direction, thus limiting the limit position of the rod portion during reciprocating rotation.

6. The electric toothbrush brush head according to claim 4, further comprising an amplitude reducing assembly arranged between the rod portion and the driving shaft to reduce the rotation amplitude of the rod portion relative to the driving shaft.

7. The electric toothbrush brush head according to claim 6, wherein the groove and the driving shaft are both cylindrical in shape, so that the rod portion and the driving shaft can rotate with each other, wherein the amplitude reducing assembly comprises:
   a first sector portion being located at the end of the driving shaft; and
   a second sector portion being located within the groove and corresponding to the first sector portion, the radii of the first sector portion, the second sector portion, and the driving shaft are the same, the radius of the groove is greater than the radius of the driving shaft, and the sum of the angles of the second sector portion and the first sector portion is less than 360°, such that the driving shaft being idle for an angle before contacting a side surface of the second sector portion during each reciprocating rotation, and thus the rotation angle of the rod portion is less than the rotation angle of the driving shaft.

8. An electric toothbrush, comprising a handle and an electric toothbrush brush head according to claim 1, wherein a driving shaft being provided on the handle, and the electric toothbrush head is detachably connected to the driving shaft.

* * * * *